G. E. BISHOP.
AUTOMOBILE CURTAIN.
APPLICATION FILED FEB. 9, 1917.
1,253,341.
Patented Jan. 15, 1918.
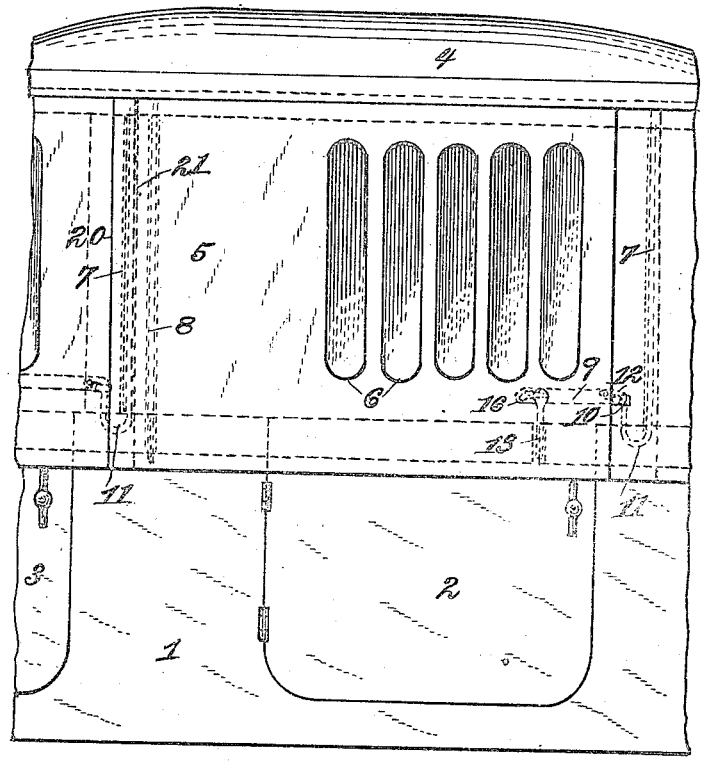
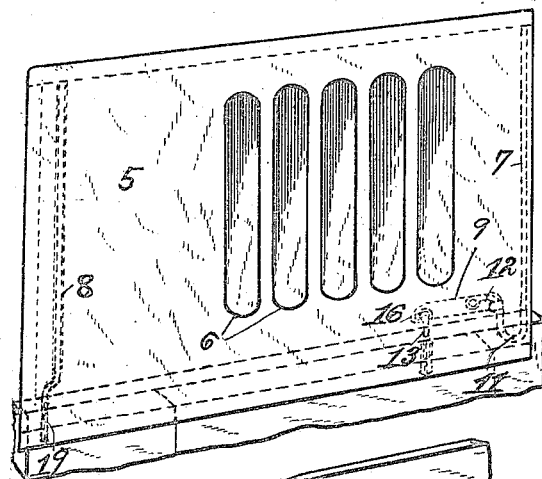
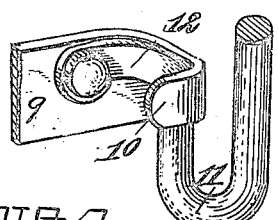
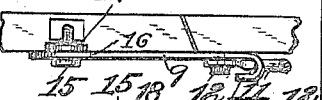
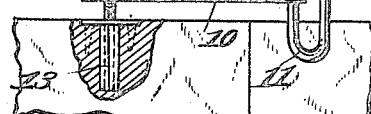
Inventor.
George E. Bishop
By
Merkel and Saywell
Attorneys

GEORGE E. BISHOP, OF CLEVELAND, OHIO.

AUTOMOBILE-CURTAIN.

1,253,341.

Specification of Letters Patent.  Patented Jan. 15, 1918.

Application filed February 9, 1917. Serial No. 147,694.

*To all whom it may concern:*

Be it known that I, GEORGE E. BISHOP, a citizen of the United States, resident of Cleveland, county of Cuyahoga, and State of Ohio, have invented new and useful Improvements in Automobile-Curtains, of which the following is a specification, the principle of the invention being herein explained and the best mode in which I have contemplated applying that principle, so as to distinguish it from other inventions.

My invention relates to vehicle curtains and particularly to the side sections thereof for use upon automobiles. More particularly, said invention relates to an improved curtain of this type which will be readily collapsed when not in use so that it can be conveniently rolled or folded and that, when in use, will require no further support than the supporting elements forming integral parts of the curtain itself. In other words, the necessity of buttons to which the curtain must be attached is dispensed with.

The annexed drawing and the following description set forth in detail certain means embodying my invention, the disclosed means, however, constituting but one of various mechanical forms in which the principle of the invention may be applied.

In said annexed drawing:—

Figure 1 represents a broken side elevation of the front part of an automobile upon which are mounted front and rear side curtains of my improved type; Fig. 2 represents a perspective view of said front curtain, showing broken view of the door and body of an automobile upon which said curtain is mounted; Fig. 3 represents a broken detail, upon an enlarged scale, of the pivotal connection of strengthening and stretching elements forming features of my improved curtain; Fig. 4 represents a broken plan of such features as seen in connection with the front edge of a rearwardly hinged door carrying one of the supporting rods of my improved curtain; Fig. 5 represents a side elevation of the features shown in Fig. 4; and Fig. 6 represents a broken detail, on an enlarged scale, of the pivotal connection between a door-member and a stretching member, such view particularly indicating the limited relative pivotal movement of said two members and a groove of peculiar construction forming part of the means for providing such limited pivotal movement.

Referring to the annexed drawing, an automobile body is shown at 1 provided with front and rear rearwardly hinged doors 2 and 3, respectively, and a canopy 4. My invention relates to the side sections of the automobile curtain and comprises the fabric 5 provided with the transparencies 6 and means for stretching and properly supporting said fabric. These stretching and supporting means comprise front and rear rods 7 and 8, respectively, incorporated with the fabric 5. A stretching member 9 formed with a hooked end 10 is pivotally secured to the front rod 7 by means of a U-shaped member 11 formed upon said rod and having a transversely extending end portion 12 which is pivoted to the member 9, as plainly shown in Fig. 3, said hooked end 10 receiving and confining the U-shaped member 11 and thus preventing the pivotal movement of the rod 7 to the left of a vertical position, as plainly indicated in Fig. 5. The stretching member 9 is pivotally connected to a door member 13 properly offset, as shown in Fig. 6, to fit tightly in and over the frame of the door 1, and provided with a door-engaging portion of rectangular cross section adapted to fit into a door socket of similar cross section, as plainly shown in Figs. 1 and 6, whereby any turning movement of the member 13 in its socket is prevented. This pivotal connection of the members 9 and 13 is secured by means of a lug 14 formed upon member 13 and having a head 15 by which it is retained in a slot 16 formed in the stretching member 9. The lug 14, however, is longitudinally movable in the slot 16 and pivotally movable in the lower portion 17 thereof, which lower portion is of enlarged size, as compared with an upper portion 18 within which the lug 14 is not pivotally movable. Furthermore, the portions 17 and 18 of the slot 16 are of different shapes, and the portion 18 is so shaped and so disposed with reference to the lug 14 that the latter enters the slot portion 18 only when the handle portion 13 is in the vertical position shown in Fig. 6; in other words, only when the door curtain is stretched and arranged for use, and then said handle portion remains fixed in such position when the curtain is mounted on the door. The rear rod 8 is also incorporated with the fabric 5 and has an offset lower portion 19, Fig. 2, by means of which it is conveniently supported upon the automobile body 1.

It will be noted from Fig. 1 that the rear side section of my improved curtains is overlapped by the front section thereof, the rear rod 8 of said front section being incorporated within the fabric 5 far enough away from the rear edge of said fabric as to allow the front rod 7 of the rear curtain to pass said rear edge of said front curtain, such extreme rear edge of said front curtain being indicated at 20 in said Fig. 1, and the front edge of the rear curtain being indicated at 21.

Two or more of my improved curtains will thus furnish all of the curtain protection necessary for the whole side of an automobile having two doors upon the side, and such curtains are entirely and properly supported, particularly in so far as the sections thereof moving with the doors are concerned, without any auxiliary supporting means such as buttons. Furthermore, the curtains are readily collapsible and conveniently rolled or folded for storage when they are temporarily not in use.

What I claim is:—

1. The combination in an inclosed vehicle, with a vehicle body provided with suitable entrances and doors for said entrances and a canopy; of a construction of the side curtains thereof cooperating with said canopy and collapsible, said construction comprising a pair of overlapping sections of curtain fabric, each such section inclosing the vehicle above a door and laterally adjacent thereto, combined with strengthening, stretching and fastening means for each curtain section consisting only of a pair of supporting members, parts of said members being incorporated with said fabric substantially near the ends thereof, and at least one of said parts being disposed within the overlapping area to provide a tight joint, sockets in said body and doors for detachably receiving said supporting members, respectively, said sockets and the supporting ends of said members being of cooperating relatively non-rotatable design, those supporting members mounted upon the doors comprising said supporting end, a stretching element pivoted thereto, disposed, when in operative position, at substantially right angles to said end, and extending beyond the line of the door, and a strengthening rod pivoted to said extending end of said stretching element and disposed, when in operative position, substantially parallel with said supporting end, means for preventing the pivotal movement between said end and said stretching element, and means for limiting the pivotal movement between said element and rod, when the side curtains are in operative position.

2. The combination in an inclosed vehicle, with a vehicle body provided with a suitable entrance and a door for said entrance, a canopy and a collapsible side curtain cooperating therewith; of means for strengthening, stretching and fastening said curtain by a plurality of supporting members only, part of said members being incorporated with said curtain substantially near the ends thereof, at least one of said members being supported upon said door, the body and door being provided with sockets for detachably receiving said supporting members, respectively, said sockets and the supporting ends of said members being of cooperating relatively non-rotatable design, one of said members comprising said supporting end and a strengthening rod, disposed, when in operative positions, in substantially parallel planes, together with an intermediate stretching element pivoted to each of said end and rod and disposed, when in operative position, substantially at right angles to the latter, means for limiting the pivotal movement between said rod and element, and means for preventing the pivotal movement between said element and supporting end when the side curtain is in operative position.

3. The combination in an inclosed vehicle body provided with a suitable entrance and a door for said entrance, a canopy and a collapsible side curtain cooperating therewith; of means for strengthening, stretching and fastening said curtain by a pair of supporting members only, parts of said members being incorporated with said curtain substantially near the ends thereof, the body and door being each provided with a socket of rectangular cross section to detachably receive said members, the supporting ends of the latter being also of rectangular cross section, that member which is supported upon the door comprising said supporting end and a strengthening rod disposed, when in operative positions, in substantially parallel planes, together with an intermediate stretching element pivoted to each of said end and rod and disposed, when in operative position, substantially at right angles to the latter, said element being provided with a hooked end engaging said rod and limiting their relative pivotal movement, and means preventing the pivotal movement between said element and supporting end when the side curtain is in operative position.

4. The combination with an inclosed vehicle; of a construction of the side curtains thereof which is removable and collapsible, said construction including a member for supporting one edge of the curtain consisting of a strengthening element; a stretching element pivoted to said strengthening element; and a supporting member pivoted to said stretching element and adapted to detachably support said elements on the automobile door; means for limiting the pivotal movement between said elements; and means for preventing the relative pivotal movement of said stretching element and member when in operative positions; in combination with a strengthening element for supporting the opposite edge of the curtain and adapted to be detachably secured to the automobile body.

5. The combination with an inclosed vehicle; of a construction of the side curtains thereof which is removable and collapsible, said construction including a member for supporting one edge of the curtain consisting of a strengthening element; a stretching element pivoted to said strengthening element and provided with a hooked end engaging the latter to limit their relative pivotal movement; and a supporting member provided with a door engaging portion of rectangular cross-section, said stretching element and last-mentioned member being formed with a slot and a coöperating relatively rotatable lug, respectively, said slot comprising communicating portions of different forms and cross sectional areas, the relative rotatable movement of said lug in said slot being prevented in the operative position of the curtain by disposing said lug in a predetermined portion of said slot; in combination with a strengthening element for supporting the opposite edge of the curtain and adapted to be detachably secured to the automobile body.

6. The combination with an inclosed vehicle; of a construction of the side curtains thereof which is removable and collapsible, said construction including a member for supporting one edge of the curtain consisting of a strengthening element; a stretching element pivoted to said strengthening element and provided with a hooked end engaging the latter to limit their relative pivotal movement; and a supporting member of rectangular cross section for detachably mounting the device upon a vehicle body, said stretching element and supporting member being formed with a slot of varying cross sectional area and a coöperating lug, respectively, said lug being longitudinally movable in said slot and rotatable only in that portion thereof of greater area; in combination with a strengthening element for supporting the opposite edge of the curtain and adapted to be detachably secured to the automobile body.

7. A collapsible member adapted for use in supporting automobile door curtains and similar structures consisting of a strengthening element and a supporting member, the latter adapted to be detachably secured to the automobile body; a stretching element disposed intermediately said before-mentioned element and member and pivoted to each of the latter; means adapted to prevent the relative pivotal movement of said supporting member and stretching element when in operative position; and means adapted to limit the relative pivotal movement of said stretching and strengthening elements.

8. A collapsible member adapted for use in supporting automobile door curtains and similar structures consisting of a strengthening element and a supporting member, the latter adapted to be detachably secured to the automobile body, said element and member being disposed in substantially vertical positions when in use; a stretching element disposed intermediately said before-mentioned element and member and pivoted to each of the latter, said stretching element being disposed in a substantially horizontal position when in use; means for retaining the relative operative positions of said strengthening element and said stretching element; and means for retaining the relative operative positions of said stretching element and supporting member.

Signed by me, this 3rd day of February, 1917.

GEORGE E. BISHOP.